(12) United States Patent
Ishihara

(10) Patent No.: US 7,429,347 B2
(45) Date of Patent: Sep. 30, 2008

(54) RECORDING TAPE CARTRIDGE AND METHOD OF MANUFACTURING SAID CARTRIDGE

(75) Inventor: Yusuke Ishihara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 729 days.

(21) Appl. No.: 11/074,641

(22) Filed: Mar. 9, 2005

(65) Prior Publication Data
US 2005/0145738 A1 Jul. 7, 2005

Related U.S. Application Data

(62) Division of application No. 10/610,712, filed on Jul. 2, 2003, now Pat. No. 6,913,218.

(30) Foreign Application Priority Data
Jul. 5, 2002 (JP) .............................. 2002-196706

(51) Int. Cl.
*B29C 45/14* (2006.01)
*B29C 33/00* (2006.01)
*E04B 1/16* (2006.01)

(52) U.S. Cl. .................... 264/271.1; 264/273; 264/259; 264/240; 264/35; 264/31

(58) Field of Classification Search .................. 264/31, 264/35, 120, 130, 240, 256, 259–279; 425/3, 425/279; 360/132; 242/348, 348.2, 609.4
See application file for complete search history.

(56) References Cited

U.S. PATENT DOCUMENTS

| | | | |
|---|---|---|---|
| 4,723,731 A | 2/1988 | Posso | |
| 6,264,126 B1 | 7/2001 | Shima et al. | |
| 6,315,230 B1 | 11/2001 | Hansen et al. | |
| 6,411,466 B1 * | 6/2002 | Shima et al. | 360/132 |
| 6,568,619 B1 | 5/2003 | Shiga et al. | |
| 6,687,086 B2 | 2/2004 | Morita et al. | |
| 6,736,345 B2 | 5/2004 | Hiraguchi et al. | |
| 2002/0005453 A1 * | 1/2002 | Morita | 242/608.8 |

* cited by examiner

*Primary Examiner*—Sam Chuan Yao
*Assistant Examiner*—Saeed Huda
(74) *Attorney, Agent, or Firm*—Sughrue Mion, PLLC

(57) ABSTRACT

In a recording tape cartridge, cut-out portions are formed at an inner peripheral edge portion of a metal plate. By providing gates at the cut-out portions, the metal plate is insert molded without depending on submarine gates. Because the gates are provided, at the time of molding a reel hub, a molding material flows radially from a hole portion toward a tubular portion and a lower flange.

12 Claims, 10 Drawing Sheets

RECORDING TAPE CARTRIDGE AND METHOD OF MANUFACTURING SAID CARTRIDGE

CROSS-REFERENCE TO RELATED APPLICATION

This is a divisional of application Ser. No. 10/610,712 filed Jul. 2, 2003 now U.S. Pat. No. 6,913,218, which application claims priority under 35 USC 119 from Japanese Patent Application No. 2002-196706, the disclosure of each of which is incorporated by reference herein.

BACKGROUND OF THE INVENTION

1. Field of the Invention

The present invention relates to a recording tape cartridge rotatably accommodating a single reel on which a recording tape is wound.

2. Description of the Related Art

Conventionally, among recording tape cartridges used as recording media used in external storage devices of computers for example, a type is known in which a single reel is rotatably accommodated in the recording tape cartridge. A recording tape, such as a magnetic tape, is wound on the reel within the recording tape cartridge.

The magnetic tape is used for, for example, storage of data of a computer, and there are cases in which important information is recorded thereon. In this case, the recording tape cartridge is structured such that the magnetic tape cannot be inadvertently pulled-out therefrom at the time when the recording tape cartridge is not in use (e.g., when the recording tape cartridge is being stored), so that trouble such as jamming of the tape or the like does not occur.

The reel is structured by a reel hub and upper and lower flanges which are provided at the both end portions of the reel hub. As shown in FIGS. 8 and 9, a reel hub 100 and a lower flange 102 are molded integrally. After molding, an upper flange 104 is welded so that a reel 106 is formed.

The reel hub 100 has a driven gear 108 which meshes with a driving gear 105 which transmits driving force from a driving device 103 of a drive device. An annular metal plate 110 for magnetic attraction is provided at the inner side of the driven gear 108. Due to the metal plate 110 being attracted to a magnet (not shown) provided at the driving device 103 of the drive device, axial offset is prevented, and the state in which the driven gear 108 and the driving gear 105 are meshed together is maintained.

Moreover, a lock gear 112 is formed at an inner surface of the reel hub 100 which is positioned at the opposite side of the driven gear 108. The lock gear 112 meshes with a braking gear 114A provided at a braking member 114, so as to prevent rotation of the reel 106.

A lock releasing portion 107 provided at the driving device 103 of the drive device can be inserted through a hole 110A formed in the metal plate 110. The braking member 114 is pushed up by the lock releasing portion 107, the meshed state of the braking gear 114A and the lock gear 112 is cancelled, and the reel 106 becomes able to rotate.

Three through holes 116 are formed at equal intervals in the metal plate 110. As shown in FIG. 10A, a reduced diameter portion 116A is formed at the inner peripheral edge portion of the through hole 116. A boss 118, which is of a size such that it can be inserted through the reduced diameter portion 116A, stands erect at the reel hub 100 at the position where the metal plate 110 is mounted.

After the reel hub 100 and the lower flange 102 (see FIG. 9) are molded, as shown in FIG. 10B, the bosses 118 are inserted through the reduced diameter portions 116A. As shown in FIG. 10C, the distal end portions of the bosses 118 are caulked, such that the metal plate 110 is prevented from coming off of the reel hub 100.

In this way, the metal plate 110 and the reel hub 100 are made integral. However, after the reel hub 100 and the lower flange 102 are molded, the metal plate 110 is made integral with the reel hub 100 by outsert molding. Thus, the number of work processes increases, which leads to an increase in manufacturing costs.

Thus, it has been thought to make the metal plate 110 integral with the reel hub 100 by insert molding. However, in order to reduce the dispersion of the reel hub 100 caused by molding, it is better to set the gate positions as near as possible to the axial center side.

The annular metal plate 110 is disposed at the axial center side of the reel hub 110. Thus, there is a method in which the molding material is filled in from the inner surface side of the reel hub 100 so as to flow over the hole 110A of the metal plate 110 by submarine gates. In cases in which the hole 110A of the metal plate 110 is small, it is difficult to provide a plurality of submarine gates.

SUMMARY OF THE INVENTION

In view of the aforementioned, an object of the present invention is to provide a recording tape cartridge having an inexpensive reel in which there is little dispersion due to molding.

The present invention provides a recording tape cartridge rotatably accommodating a single reel on which a recording tape is wound. The reel is structured by a hub, annular flanges, an annular metal plate, cut-out portions, and gates. The hub is hollow and on which the recording tape is wound. The annular flanges are provided at both end portions of the hub and holding transverse direction end portions of the recording tape wound around the hub. The annular metal plate is insert molded to an end portion of the hub. The cut-out portions are formed at an inner peripheral edge portion of the metal plate. The gates for filling of a molding material are provided in the cut-out portions.

In the present invention, a plurality of cut-out portions are formed at an inner peripheral edge portion of a metal plate. By providing gates in the cut-out portions, the metal plate can be insert molded without depending on submarine gates. Thus, no problems arise even if the hole portion of the metal plate is small. Accordingly, there is no need to outsert mold the metal plate. The number of work processes can be reduced, and the cost of the reel can be reduced.

Further, by providing the gates in the cut-out portions which are formed at the inner peripheral edge portion of the metal plate, when the reel hub is molded, the molding material flows radially from the inner peripheral edge side of the reel hub toward the outer peripheral edge side. Thus, there is little fluctuation in the pressure of the molding material, and the residual stress can be decreased. Therefore, dispersion of the reel hub caused by molding can be reduced, and the dimensional accuracy can be increased.

Moreover, by forming the cut-out portions and providing the gates in the cut-out portions, the molding material is filled in the cut-out portions, and it is possible to prevent the metal plate from rotating. In addition, by forming the inner peripheral edge portion of the cut-out portion in a particular shape, the molding material flows in at the inner peripheral edge portion along that shape. Thus, it is possible to prevent the metal plate from being pulled off.

Further, an annular portion, which connects the plurality of gates along the inner peripheral edge portion of the metal plate, may be provided. In this way, the molding material which is filled in from the gates flows at the reverse surface of the metal plate from the gates toward the outer edge side of the reel hub, and also flows to the annular portion. Thus, the molding material flows radially from the entire periphery of the inner peripheral edge portion of the reel hub toward the outer peripheral edge portion side, and the weld line can be made to be inconspicuous. Accordingly, the problem of cracking due to changes over time does not arise.

DETAILED DESCRIPTION OF THE INVENTION

Hereinafter, a summary of a recording tape cartridge (hereinafter called "magnetic tape cartridge") relating to an embodiment of the present invention will be given.

Figure 1:
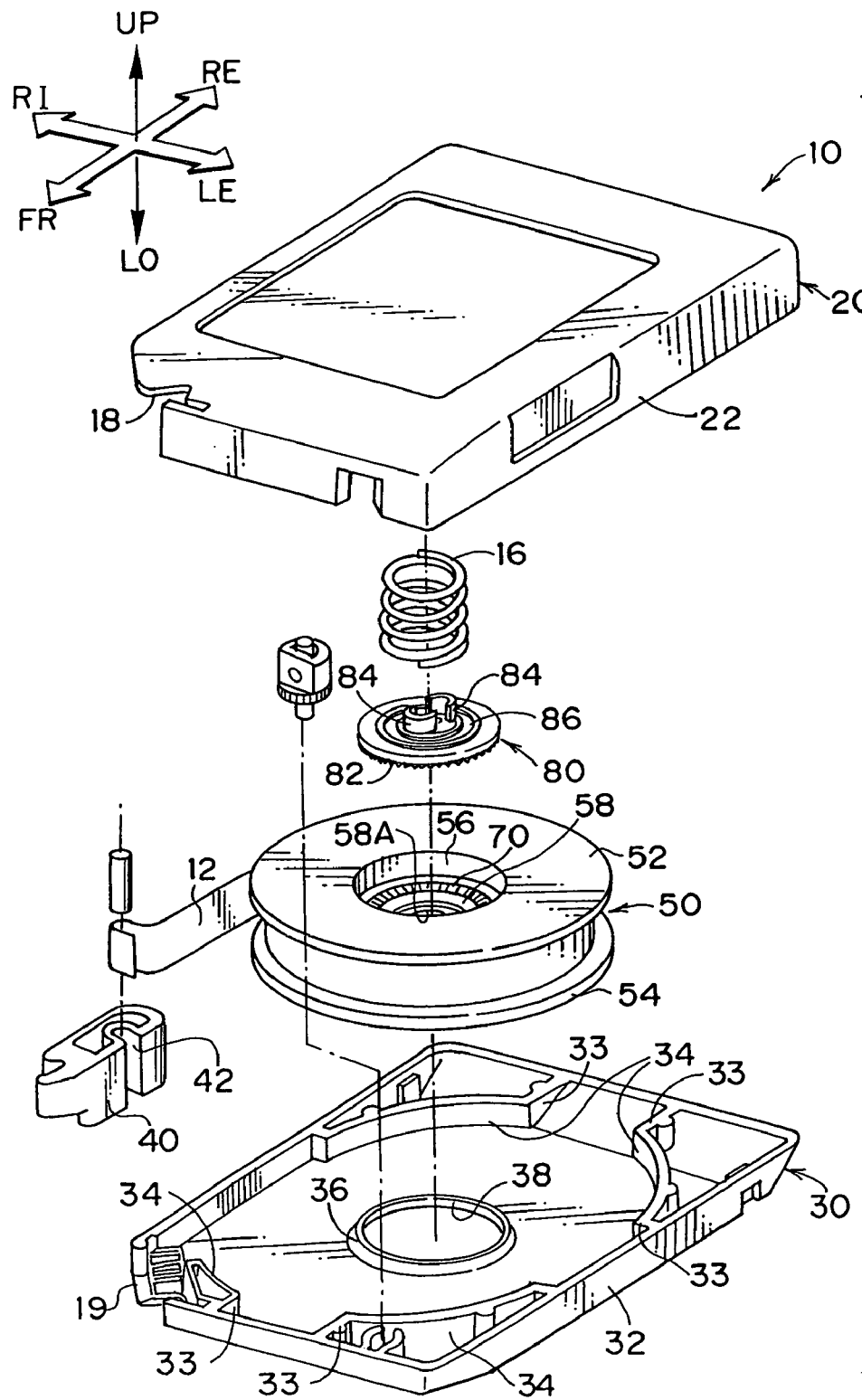
FIG. 1 is an exploded perspective view of a recording tape cartridge relating to an embodiment of the present invention.
Figure 2:
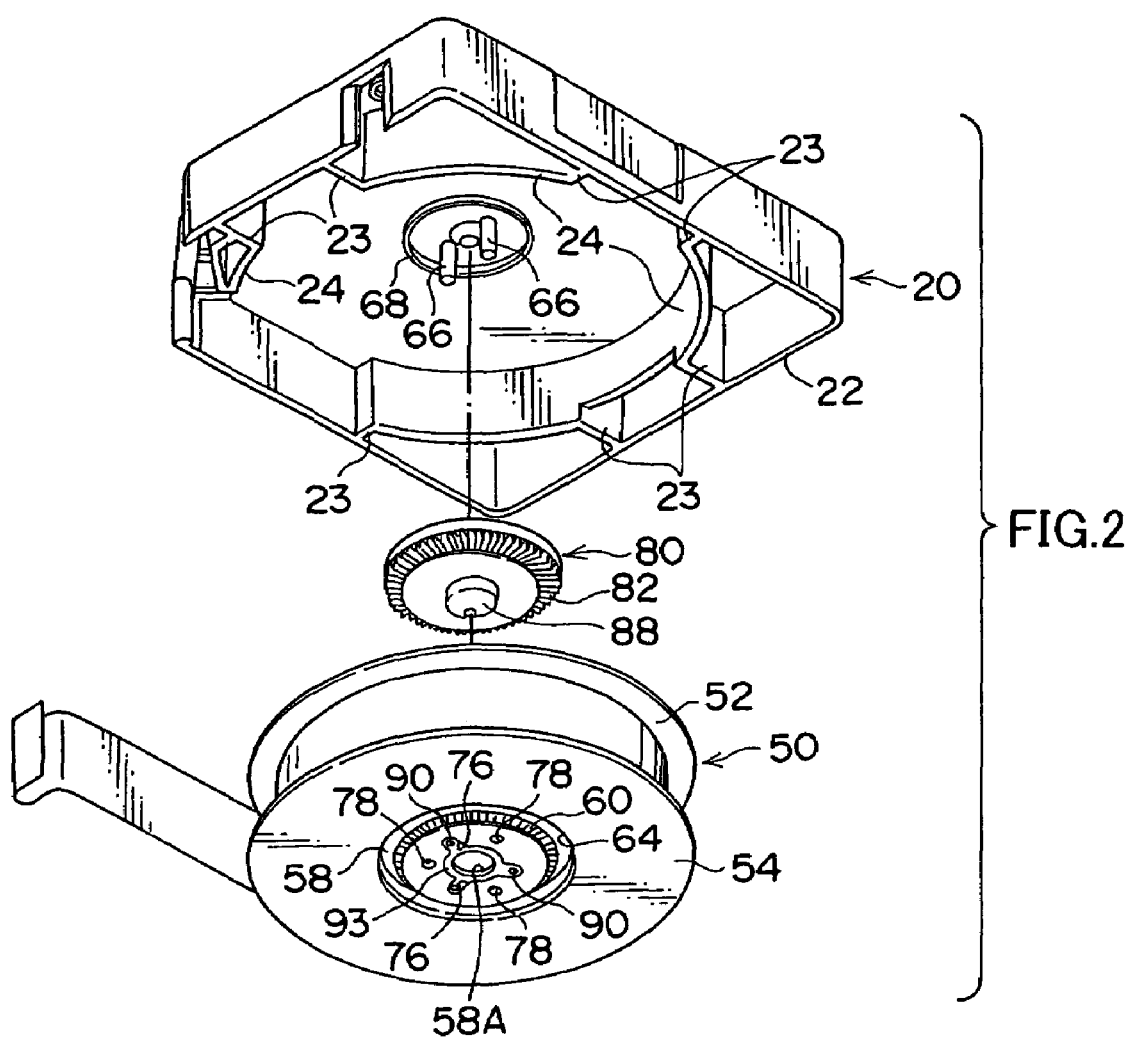
FIG. 2 is an exploded perspective view, as seen from below, of the recording tape cartridge relating to the embodiment.
Figure 3:
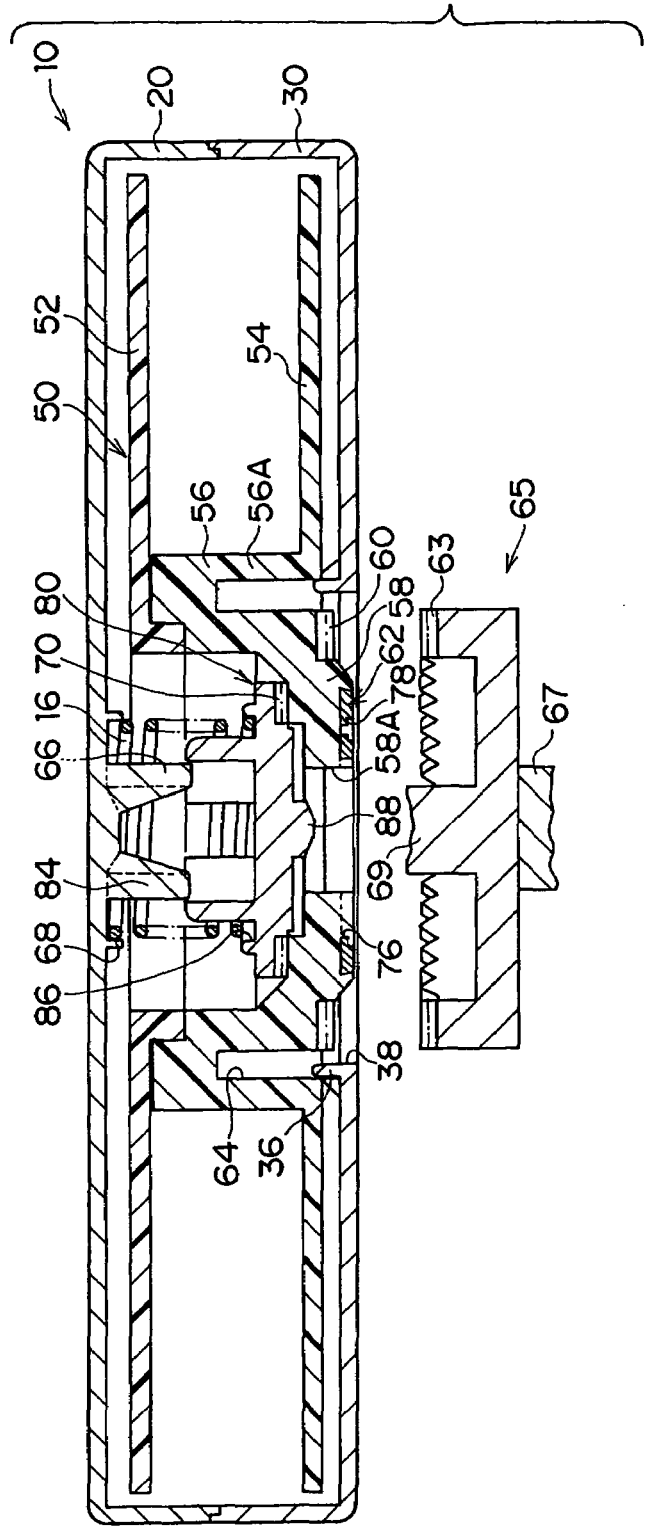
FIG. 3 is a sectional view of the recording tape cartridge relating to the embodiment, and a driving device of a drive.

As shown in FIGS. 1 through 3, the recording tape cartridge 10 is formed by an upper case 20 and a lower case 30 which are formed of a synthetic resin in substantial box-shapes. A peripheral wall 22 of the upper case 20 and a peripheral wall 32 of the lower case 30 are welded together by, for example, ultrasonic welding.

Tubular walls 24, 34 stand upright at the inner surfaces of the upper case 20 and the lower case 30, respectively. The inner diameters of the tubular walls 24, 34 are formed to be slightly larger than the outer diameters of an upper flange 52 and a lower flange 54 of a reel 50, and the reel 50 is rotatably accommodated at the inner sides of the tubular walls 24, 34.

A plurality of ribs 23 are provided between the tubular wall 24 and the peripheral wall 22. A plurality of ribs 33 are provided between the tubular wall 34 and the peripheral wall 32. The tubular wall 24 and the peripheral wall 22 are connected by the ribs 23, and the tubular wall 34 and the peripheral wall 32 are connected by the ribs 33. The tubular walls 24, 34 and the peripheral walls 22, 32 are thereby strengthened.

The reel 50 is structured by a tubular reel hub 56, and the upper flange 52 and the lower flange 54 which are provided at the both end portions of the reel hub 56. The widthwise direction end portions of a magnetic tape 12, which serves as an information recording/playback medium and which is wound on the reel hub 56, are held at the upper flange 52 and the lower flange 54.

A bottom wall 58 is provided at the lower flange 54 of the reel hub 56. A hole portion 58A is formed in the center of the bottom wall 58. An annular reel gear 60 (driven gear) projects out from the bottom wall 58 at the bottom surface side of the bottom wall 58.

The reel gear 60 can emerge from a circular open hole 38 provided at the center of the lower case 30, and meshes with a driving gear 63 provided at a driving device 65 of a drive device so as to transmit rotational force to the reel 50.

An annular metal plate 62 is molded integrally at the inner side of the reel gear 60. Due to the metal plate 62 being attracted to a magnet (not shown) provided at the driving device 65 of the drive device, axial offset is prevented, and the meshed-together state of the reel gear 60 and the driving gear 63 can be maintained.

An annular groove 64 is provided at the outer side of the reel gear 60. The reel 50 is positioned with respect to the lower case 30 due to a rib 36, which stands erect at the peripheral edge portion of the open hole 38 provided at the case 30, being inserted into the annular groove 64.

An annular reel gear 70 is formed at the top surface side of the bottom wall 58 of the reel hub 56. The reel gear 70 can mesh with a braking gear 82 which is formed at the outer peripheral portion of the bottom surface of a substantially disc-shaped braking member 80 which can be accommodated within the reel hub 56.

Ribs 84, which are substantially U-shaped as seen in plan view (and are referred to hereinafter as "U-shaped ribs"), stand erect at the top surface of the braking member 80 such that the open sides thereof oppose each other. A pair of anchor pins 66 are provided so as to hang down from the center of the inner surface of the upper case 20, and can engage with the U-shaped ribs 84.

In this way, the U-shaped ribs 84 of braking member 80 can move along the anchor pins 66 and within the reel hub 56, and rotation of the braking member 80 is impeded. Thus, when the magnetic tape cartridge 10 is not being used, the braking gear 82 of the braking member 80 and the reel gear 70 mesh together, and rotation of the reel 50 is prevented.

An annular groove 86 is provided at the outer side of the U-shaped ribs 84 of the braking member 80. An annular projection 68 projects at the outer side of the anchor pins 66 of the upper case 20. A spring 16 is provided between the braking member 80 and the upper case 20, and is held by the annular projection 68 and the annular groove 86.

In this way, the braking member 80 is urged toward the reel gear 70, and the braking gear 82 and the reel gear 70 can strongly mesh together. Thus, inadvertent rotation of the reel 50 is reliably prevented.

A projection 88, which is substantially solid-cylindrical and which can be inserted through the hole portion 58A, projects at the center of the bottom surface of the braking member 80. Before the reel gear 60 meshes with the driving gear 63 and rotational force is transmitted to the reel 50, a meshing releasing pin 69, which is provided at the distal end portion of a rotating shaft 67 provided at the driving device 65 of the drive device, abuts the projection 88. The braking member 80 is thereby pushed upwardly against the urging force of the spring 16, and the meshing of the braking gear 82 and the reel gear 60 is released. In this way, the reel 50 is able to rotate.

Opening portions 18, 19 are formed at the front left corner portions of the peripheral wall 22 of the upper case 20 shown in FIG. 1 and the peripheral wall 32 of the lowercase 30, respectively. The opening portions 18, 19 are for enabling the magnetic tape 12, which is wound on the reel 50, to be pulled out to the exterior.

A leader block 40 is attached to the distal end portion of the magnetic tape 12. An unillustrated pull-out pin provided at the drive device engages with a concave portion 42 formed in the leader block 40, and the magnetic tape 12 is taken-up by a take-up reel provided at the drive device. At this time, the reel 50 and the take-up reel are driven to rotate synchronously, and data is recorded or played-back while the magnetic tape 12 is successively taken-up onto the take-up reel.

When the magnetic tape cartridge 10 is not being used, the leader block 40 is anchored at the peripheral edges of the opening portions 18, 19, and the opening portions 18, 19 are closed by the leader block 40.

Next, the reel of the recording tape cartridge relating to the embodiment of the present invention will be described.

As shown in FIG. 3, the reel hub 56 and the lower flange 54, which structure the reel 50, are molded integrally. After the reel hub 56 and the lower flange 54 are molded, the upper flange 52 is welded to the reel hub 56 by ultrasonic waves, and the reel 50 is formed.

The metal plate 62 is provided at the inner side of the reel gear 60 formed at the reel hub 56. The metal plate 62 is inserted into a mold 81 (see FIG. 5) which molds the reel hub 56 and the lower flange 54, and the metal plate 62 is molded integrally with the reel hub 56 and the lower flange 54.

Figure 5:
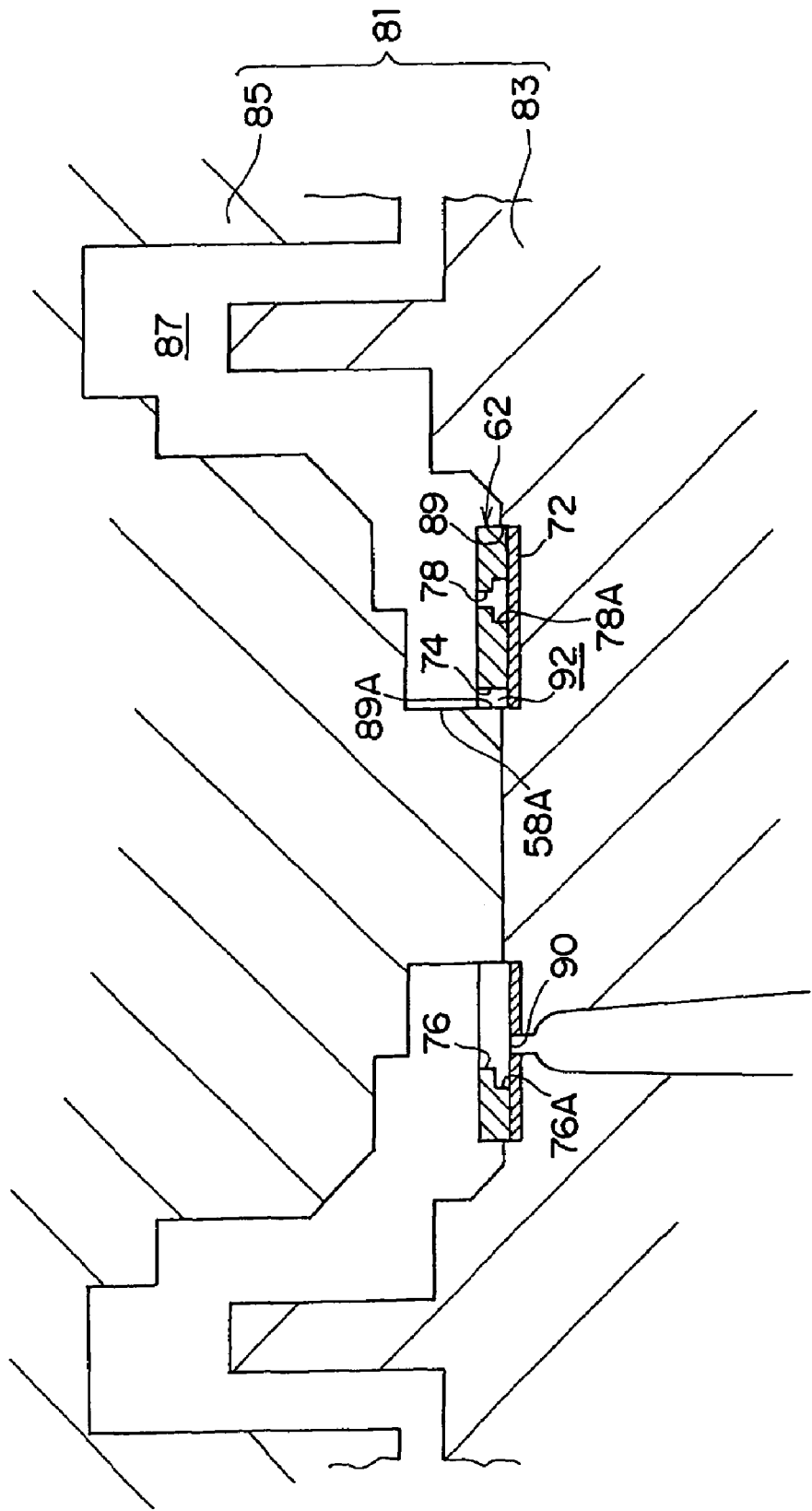
FIG. 5 is a schematic sectional view showing a state in which a metal plate is fixed in a mold for molding a reel hub and a lower flange of the reel provided at the recording tape cartridge relating to the embodiment.

As shown in FIG. 5, a fixed side mold plate 83 and a movable side mold plate 85 are provided at the mold 81. In the state in which the metal plate 62 is fixed at the fixed side mold plate 83, the mold 81 is clamped. A molding material is filled into a cavity 87 formed by the fixed side mold plate 83 and the movable side mold plate 85, and the reel hub 56 and the lower flange 54 (refer to FIG. 3 for both) are molded.

Here, an annular concave portion 89, which has an inner diameter which is substantially the same as the outer diameter of the metal plate 62, is formed in a recessed manner in the fixed side mold plate 83. In the state in which the mold 81 is open, the metal plate 62 is set within the annular concave portion 89, so as to be positioned with respect to the fixed side mold plate 83.

Moreover, an annular magnetic body 72 is disposed at the bottom surface of the annular concave portion 89 at the fixed side mold plate 83. The magnetic body 72 is fixed such that the metal plate 62 set within the annular concave portion 89 does not fall out. Note that the magnetic body 72 is not needed in a case in which the metal plate 62 is reliably fixed within the annular concave portion 89 due to, for example, the depth of the annular concave portion 89.

Figure 4:
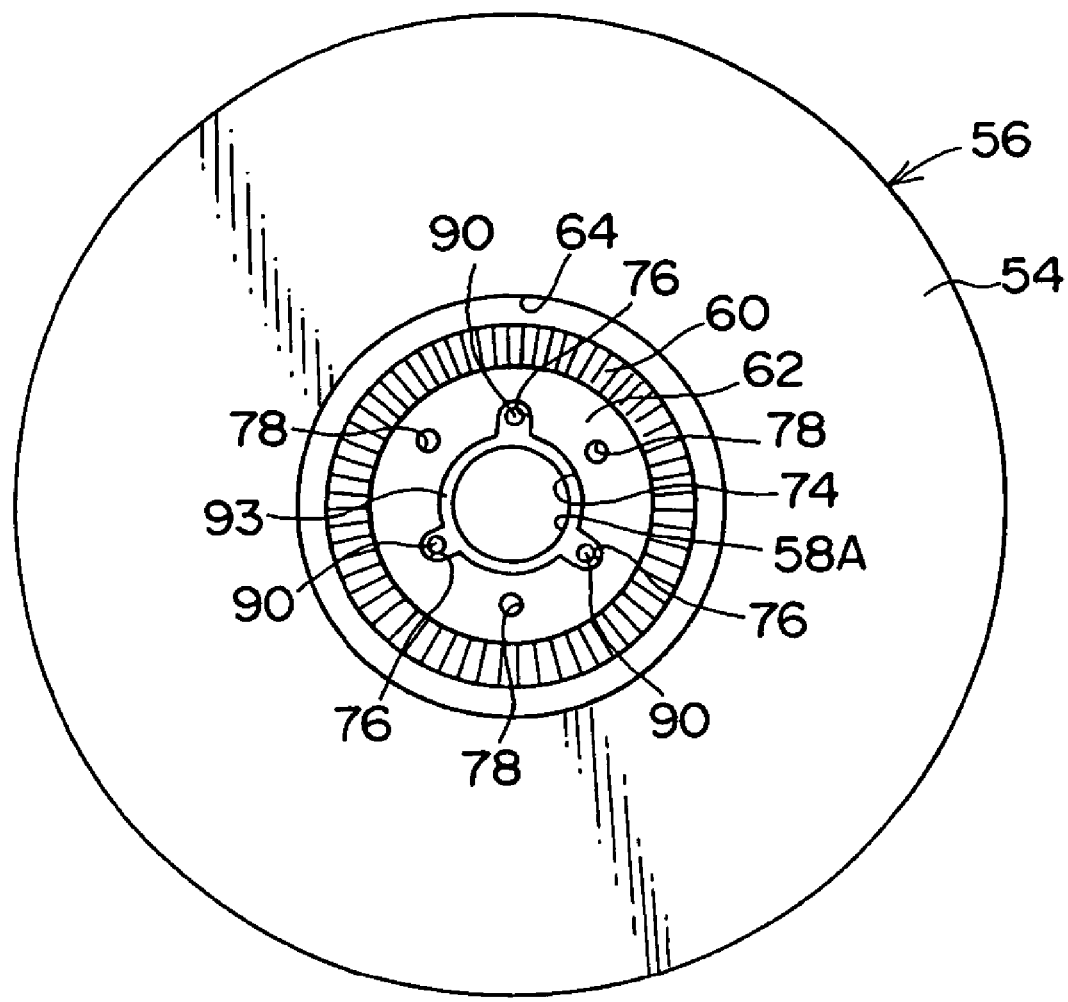
FIG. 4 is a rear view of a reel provided at the recording tape cartridge relating to the embodiment.

As shown in FIGS. 4 and 5, three cut-out portions 76 are provided at uniform intervals at an inner peripheral edge portion 74 of the metal plate 62. An enlarged diameter portion 76A is provided at the inner peripheral edge portion of the cut-out portion 76. When the metal plate 62 is set within the annular concave portion 89 of the fixed side mold plate 83, the metal plate 62 is set such that the enlarged diameter portion 76A side thereof becomes the bottom surface side of the annular concave portion 89.

A gate 90, which is for filling the molding material into the cavity 87 by a pin gate, is provided within the cut-out portion 76. Moreover, a gap 92 is provided between the inner peripheral edge portion 74 of the metal plate 62 and an inner peripheral wall 89A of the annular concave portion 89. The molding material flows into the gap 92, such that an annular portion 93, which joins the gates 90 along the inner peripheral edge portion 74 of the metal plate 62, is provided.

Through holes 78 are formed between the adjacent cut-out portions 76, on a circle which is concentric with the inner peripheral edge portion 74 of the metal plate 62. An enlarged diameter portion 78A is provided at the inner peripheral edge portion of the through hole 78, in the same way as and at the same surface side of the metal plate 62 as the inner peripheral edge portion of the cut-out portion 76.

Next, operation of the reel hub forming the reel of the recording tape cartridge relating to the embodiment of the present invention will be described.

As shown in FIGS. 3 through 5, the plurality of cut-out portions 76 are formed in the inner peripheral edge portion 74 of the metal plate 62, and the gates 90 are provided in the cut-out portions 76. The metal plate 62 can thereby be insert molded without depending on submarine gates. Thus, there is no problem even if the hole portion 58A of the reel hub 56 is small. Accordingly, there is no need to outsert mold the metal plate 62, the number of work processes can be drastically reduced, and the cost of the reel 50 can be decreased.

Further, by providing the gates 90 in the cut-out portions 76 formed at the inner peripheral portion 74 of the metal plate 62, when the reel hub 56 is molded, the molding material flows radially toward a tubular portion 56A and the lower flange 54 from the hole portion 58A of the reel hub 56. Thus, there is little variation in pressure of the molding material, and the residual stress can be made to be small. Therefore, dispersion of the reel hub 56 due to molding can be decreased, and the dimensional accuracy can be improved.

Moreover, by forming the cut-out portions 76 in the inner peripheral portion 74 of the metal plate 62 and providing the gates 90 in the cut-out portions 76, the molding material is filled into the cut-out portions 76, and it is possible to prevent rotation of the metal plate 62. The same effects are achieved with respect to the through holes 78 as well.

Moreover, by making the inner peripheral edge portion of the cut-out portion 76 and the inner peripheral edge portion of the through hole 78 have the above-described configurations, the molding material flows in these inner peripheral edge portions along the configurations thereof. Thus, the metal plate 62 can be prevented from being pulled-out.

Moreover, the gap 92 is provided between the inner peripheral edge portion 74 of the metal plate 62 and the inner peripheral wall 89A of the annular concave portion 89, and the molding material flows into this gap 92. The molding material filled in from the gates 90 thereby flows radially toward the tubular portion 56A and the lower flange 54 from the inner peripheral edge portion 74 of the metal plate 62, and it is possible to make the well drain inconspicuous. Accordingly, the problem of cracks arising due to changes over time does not arise.

Here, by forming the inner peripheral edge portions of the cut-out portions 76 and the inner peripheral edge portions of the through holes 78 to have the above-described configurations, the strength against pulling the metal plate 62 out is increased. However, it is not absolutely necessary to provide both the cut-out portions 76 and the through holes 78.

Thus, it is not absolutely necessary to form the through holes 78 in the metal plate 62. By not providing the through holes 78 in the metal plate 62, the surface area of the metal plate 62 increases, and the attractive force with the magnet (not illustrated) provided at the driving device 65 of the drive device can be improved.

Figure 6:
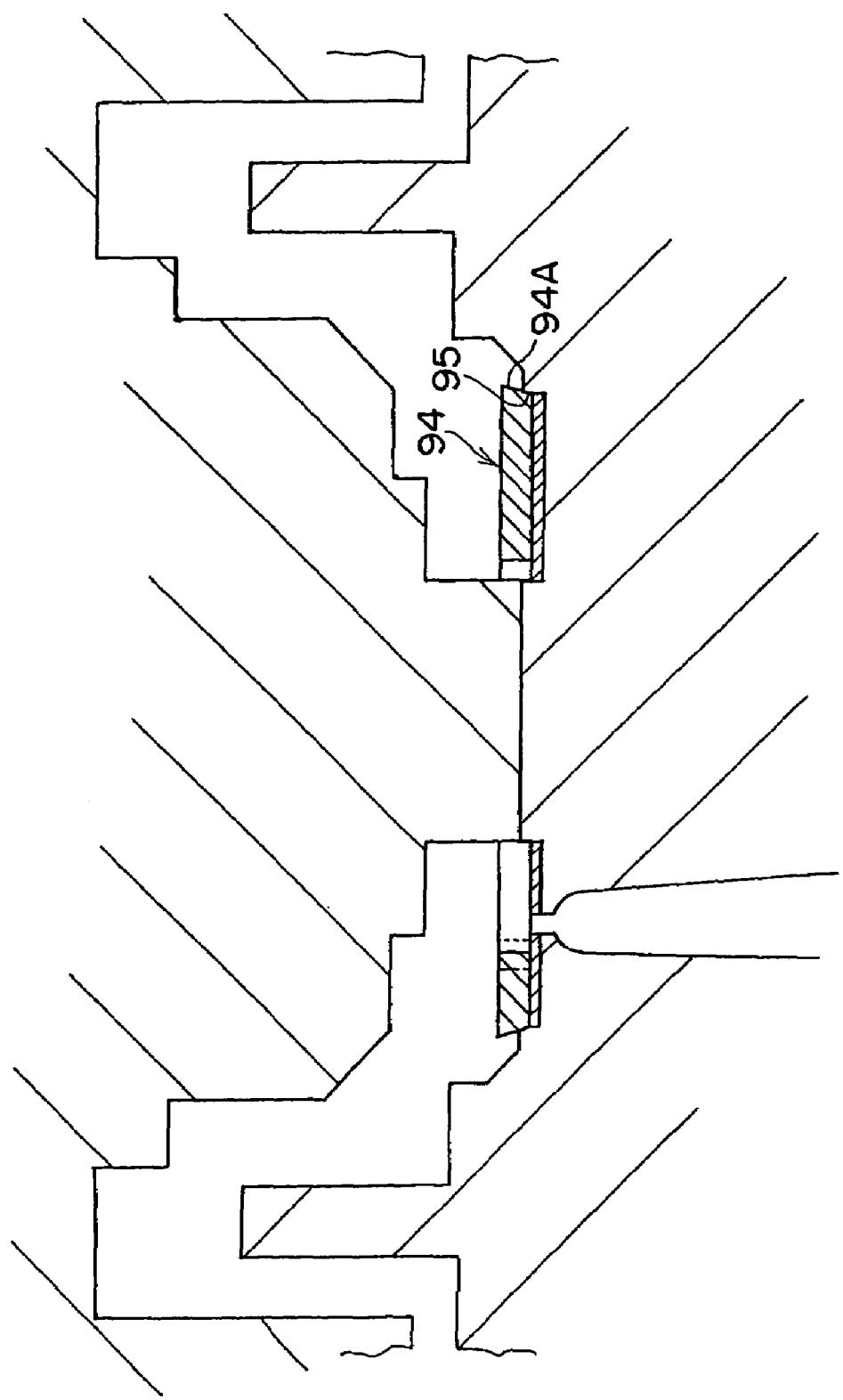
FIG. 6 is a schematic sectional view showing a state in which another metal plate is fixed in the mold for molding the reel hub and the lower flange of the reel provided at the recording tape cartridge relating to the embodiment.

The metal plate 62 is prevented from being pulled-out by forming the cut-out portions 76 and the through holes 78 in the above-described configurations. However, the present invention is not limited to the same. For example, as shown in FIG. 6, pulling-out of a metal plate 94 can be prevented by providing a taper portion 94A at the outer peripheral edge portion of the metal plate 94 and by placing the metal plate 94 such that the reduced diameter side of this taper portion 94A becomes the bottom surface side of an annular concave portion 95. Further, as shown in FIG. 7, a metal plate 96 can be prevented from being pulled-out by forming an outer peripheral edge portion 96A of the metal plate 96 in the above-described configuration.

In addition, as shown in FIG. 4, the gap 92 is provided between the inner peripheral edge portion of the metal plate 62 and the inner peripheral wall 89A of the annular concave portion 89, and the annular portion 93 connecting the gates 90 is provided. However, the annular portion 93 is not absolutely necessary, and a state in which the gates 90 are separated suffices.

Here, as shown in FIG. 5, the annular concave portion 89 is formed in a recessed manner in the fixed side mold plate 83 in order to fix the metal plate 62 at the fixed side mold plate 83. However, the annular concave portion 89 is not absolutely necessary.

Figure 7:
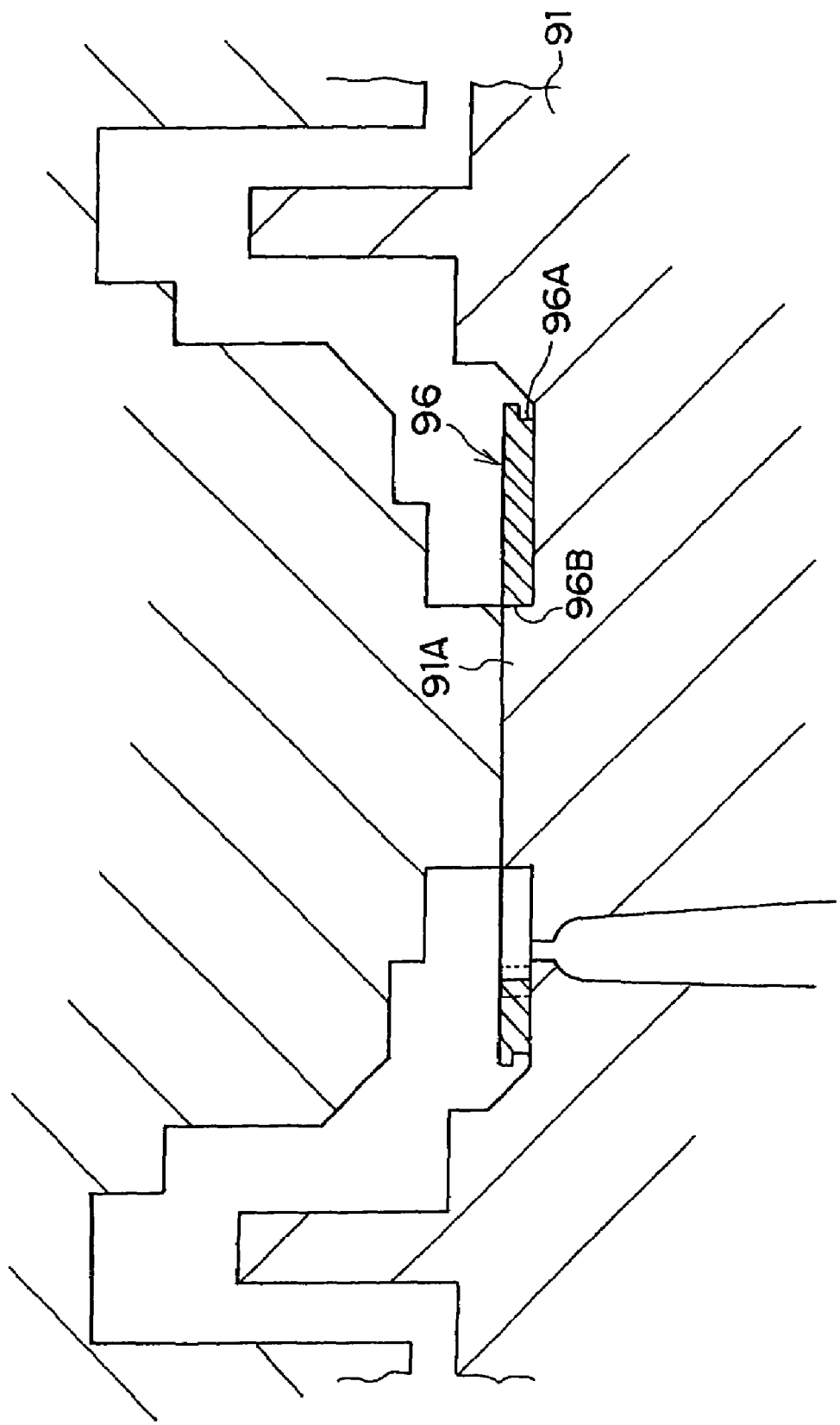
FIG. 7 is a schematic sectional view showing a state in which yet another metal plate is fixed in the mold for molding the reel hub and the lower flange of the reel provided at the recording tape cartridge relating to the embodiment.
Figure 8:
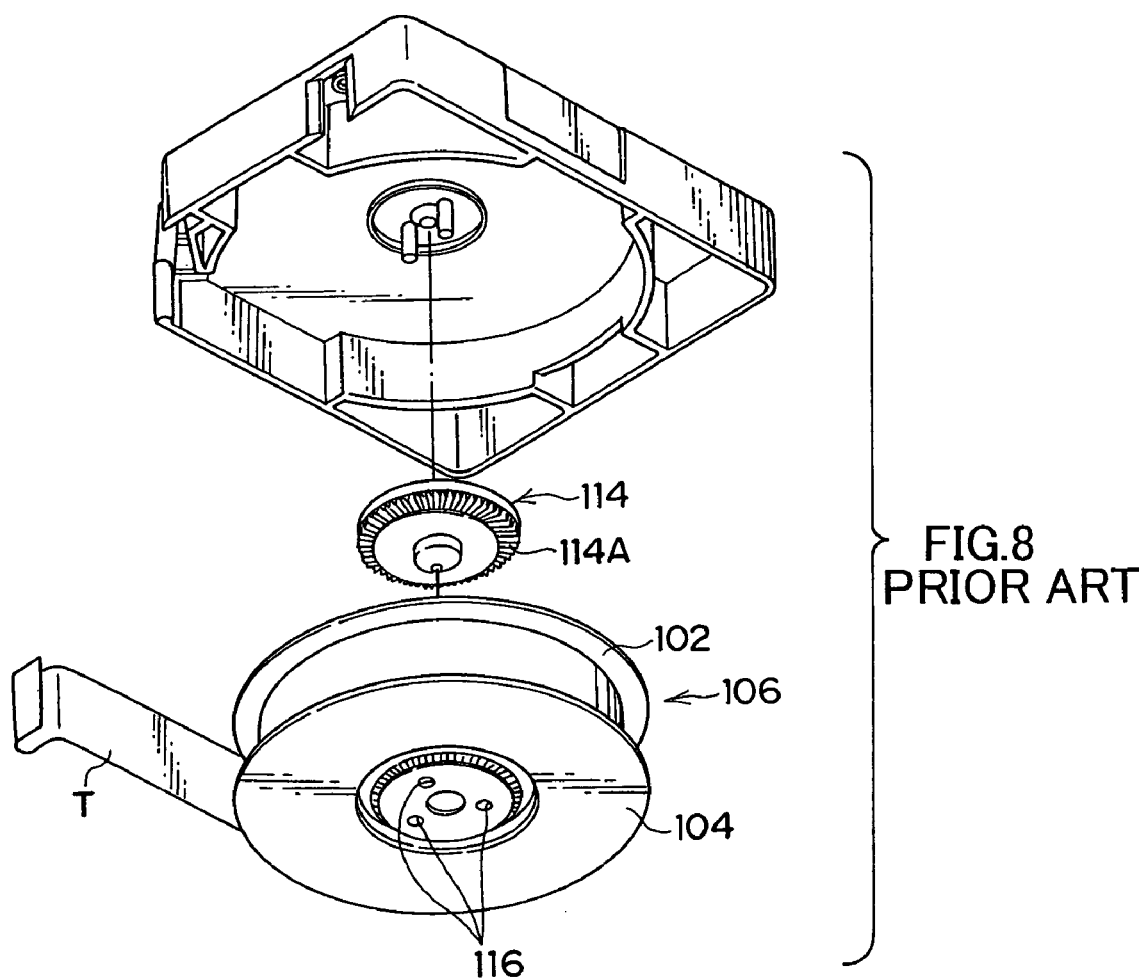
FIG. 8 is an exploded perspective view, as seen from below, of a conventional recording tape cartridge.
Figure 9:
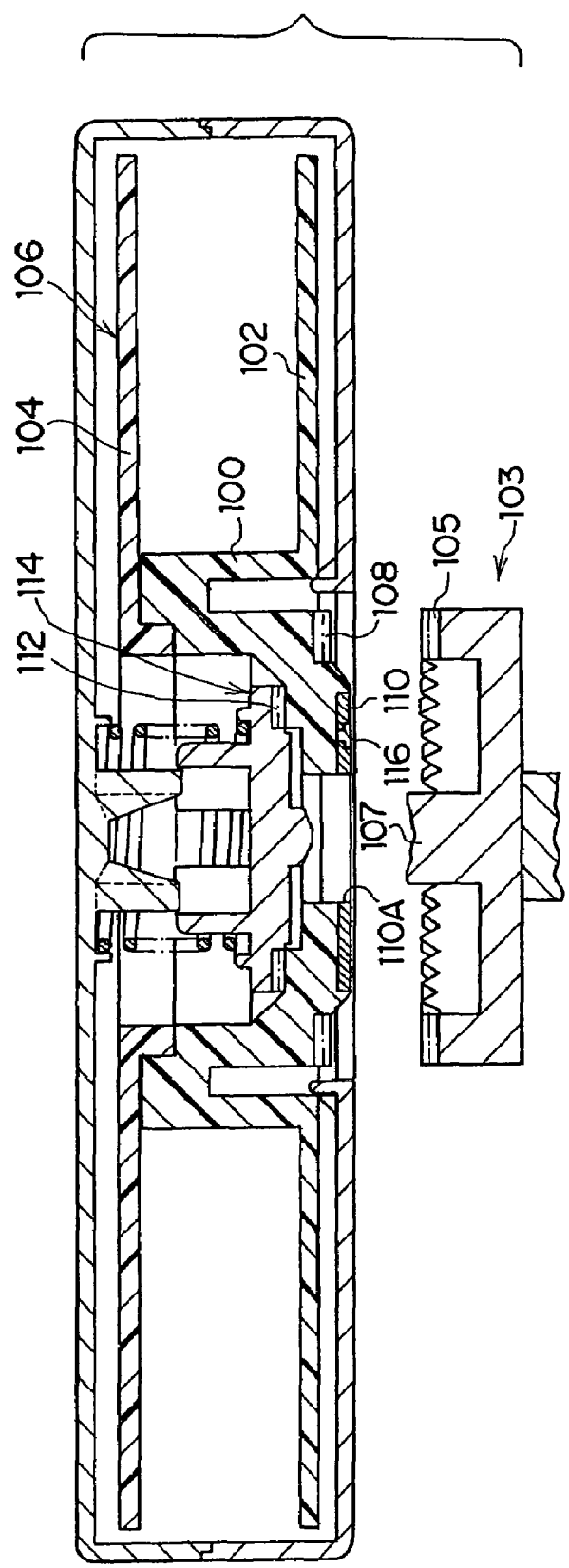
FIG. 9 is a sectional view of the conventional recording tape cartridge, and a driving device of a drive.
Figure 10A:
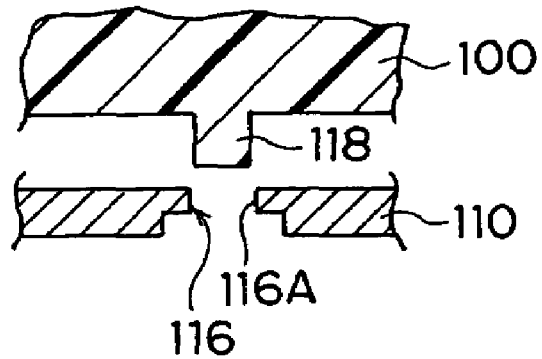
FIGS. 10A through 10C are sectional views showing a method of outsert molding a metal plate at a reel hub.
Figure 10B:
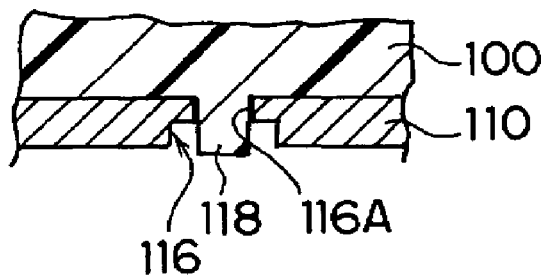
Figure 10C:
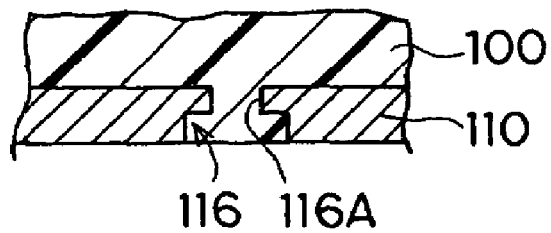

For example, as shown in FIG. 7, in a case in which the annular portion 93 (see FIG. 4) is not provided at an inner peripheral edge portion 96B of the metal plate 96, the metal plate 96 may be fixed to a fixed side mold plate 91 by forming a solid cylindrical projecting portion 91A at the fixed side mold plate 91 and placing the inner peripheral edge portion 96B of the metal plate 96 at the projecting portion 91A.

Because the present invention has the above-described structure, by forming a plurality of cut-out portions at the inner peripheral edge portion of a metal plate and by providing gates within the cut-out portions, the metal plate can be insert molded without depending on submarine gates. Thus, no problem arises even if the hole portion of the metal plate is small. Accordingly, there is no need to outsert mold the metal plate, and the number of work processes can be reduced, and the cost of the reel can be decreased. Moreover, by providing the gates in the cut-out portions formed at the inner peripheral edge portion of the metal plate, when the reel hub is molded, the molding material flows radially from the inner peripheral edge side of the reel hub toward the outer peripheral edge side. Therefore, there is little variation in the pressure of the molding material, and the residual stress can be made to be small. Thus, dispersion of the reel hub due to molding can be decreased, and the dimensional accuracy can be improved.

What is claimed is:

1. A method of manufacturing a recording tape cartridge which rotatably accommodates a reel having a hub which is hollow and on which the recording tape is wound; annular flanges provided at both end portions of the hub and holding transverse direction end portions of the recording tape wound around the hub; and an annular metal plate which is insert molded to an end portion of the hub, said method comprising the steps of:

forming at least one cut-out portion at an inner peripheral edge portion of the metal plate; and providing, in the cut-out portion, a gate for filling of a molding material.

2. The method of manufacturing a recording tape cartridge of claim 1, wherein the step of providing the gate includes providing a plurality of the gates, and further includes providing, in the metal plate, an annular portion which connects the plurality of gates along the inner peripheral edge portion of the metal plate.

3. The method of manufacturing a recording tape cartridge of claim 1, wherein the step of forming at least one cut-out portion includes providing three cut-out portions at uniform intervals at the inner peripheral edge portion of the metal plate, and further includes providing an enlarged diameter portion at an inner peripheral edge portion of the cut-out portion.

4. The method of manufacturing a recording tape cartridge of claim 1, further comprising a step of providing a taper portion at an outer peripheral edge portion of the metal plate.

5. The method of manufacturing a recording tape cartridge of claim 1, further comprising a step of providing a step at an outer peripheral edge portion of the metal plate.

6. The method of manufacturing a recording tape cartridge of claim 1, further comprising a step of using a mold which integrally molds the annular flanges and the hub, wherein the mold has a fixed side mold plate and a movable side mold plate, and said method further comprises a step of placing and fixing the inner peripheral edge portion of the metal plate at a solid-cylindrical projecting portion provided at the fixed side mold plate.

7. The method of manufacturing a recording tape cartridge of claim 2, further comprising a step of using a mold which integrally molds the annular flanges and the hub, wherein the mold has a fixed side mold plate and a movable side mold plate, and an annular concave portion having an inner diameter which is the same as an outer diameter of the metal plate is formed in the fixed side mold plate, and providing of the annular concave portion includes providing a gap between the inner peripheral edge portion of the metal plate and an inner peripheral wall of the annular concave portion of the fixed side mold plate.

8. The method of manufacturing a recording tape cartridge of claim 3, further comprising the step of forming through holes, on a circle concentric with the inner peripheral edge portion of the metal plate, between the cut-out portions which are adjacent.

9. The method of manufacturing a recording tape cartridge of claim 3, further comprising a step of using a mold which integrally molds the annular flanges and the hub, wherein the mold has a fixed side mold plate and a movable side mold plate, and an annular concave portion having an inner diameter which is the same as an outer diameter of the metal plate is formed in the fixed side mold plate, and said method further comprises a step of placing the metal plate in the annular concave portion and positioning the metal plate with respect to the fixed side mold plate.

10. The method of manufacturing a recording tape cartridge of claim 4, further comprising a step of using a mold which integrally molds the annular flanges and the hub, wherein the mold has a fixed side mold plate and a movable side mold plate, and an annular concave portion having an inner diameter which is the same as an outer diameter of the metal plate is formed in the fixed side mold plate, and said method further comprises the step of placing a reduced diameter portion of the taper portion so as to face a bottom surface of the annular concave portion.

11. The method of manufacturing a recording tape cartridge of claim 9, wherein positioning of the metal plate includes placing the metal plate such that the enlarged diameter portion of the cut-out portion becomes a bottom surface side of the annular concave portion.

12. The method of manufacturing a recording tape cartridge of claim 9, wherein positioning of the metal plate includes fixing the metal plate by an annular magnetic body disposed at a bottom surface of the annular concave portion of the fixed side mold plate.

* * * * *